(No Model.)
E. B. WELLS.
CORN PLANTER.
No. 462,223. Patented Oct. 27, 1891.
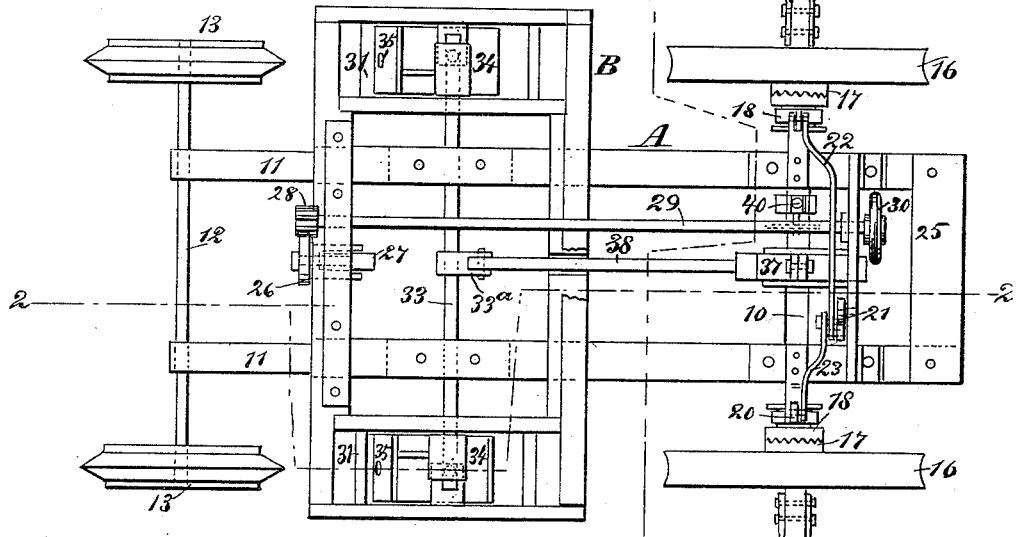
Fig: 1.
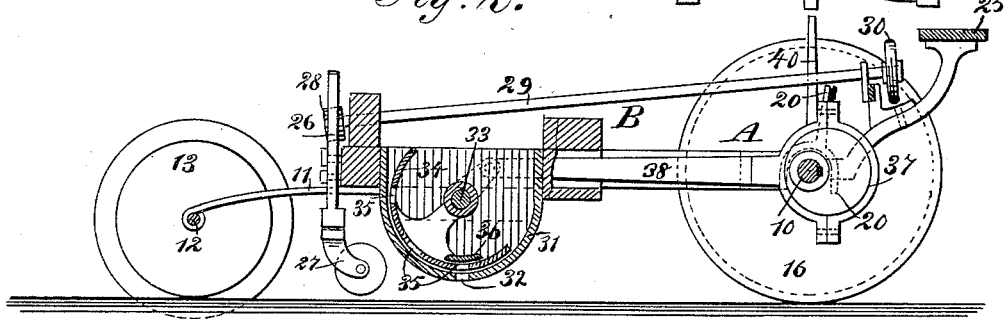
Fig: 2.
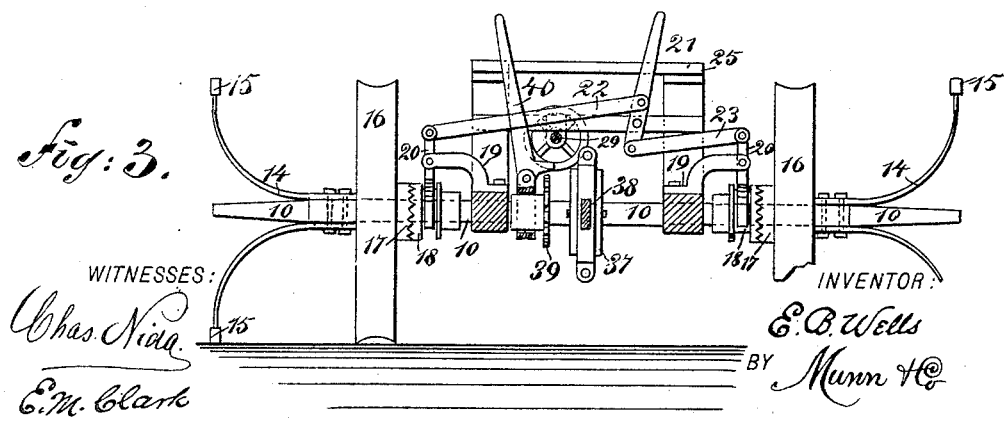
Fig: 3.
WITNESSES:
Chas. Nida.
E. M. Clark
INVENTOR:
E. B. Wells
BY Munn & Co.
ATTORNEYS

UNITED STATES PATENT OFFICE.

EDWARD B. WELLS, OF NEW CASTLE, KENTUCKY.

CORN-PLANTER.

SPECIFICATION forming part of Letters Patent No. 462,223, dated October 27, 1891.

Application filed March 28, 1891. Serial No. 386,830. (No model.)

*To all whom it may concern:*

Be it known that I, EDWARD B. WELLS, of New Castle, in the county of Henry and State of Kentucky, have invented a new and useful Improvement in Corn-Planters, of which the following is a full, clear, and exact description.

My invention relates to an improvement in corn-planters, and has for its object to provide an implement of simple and economic construction capable of being readily manipulated to register with the last check.

A further object of the invention is to provide a means whereby the check-row markers may be conveniently and expeditiously rotated by hand and wherein the seed-drop slides may be manipulated also by hand to drop at any desired point in the path of the machine.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the machine. Fig. 2 is a longitudinal section taken practically on the line 2 2 of Fig. 1, and Fig. 3 is a transverse section taken on the line 3 3 of Fig. 1.

The frame of the machine is preferably made in two sections A and B. The section A is a longitudinal section and is preferably rectangular in general contour, the said section A being supported upon an axle 10, which axle is free to turn in suitable bearings. The section B of the frame is also rectangular, or practically so, and is supported upon or located beneath the forward end of the section A and extends beyond each side of the latter section.

Forwardly-extending arms 11 are secured to the forward end of the frame-section A, and in bearings formed on said arms a forward axle 12 is journaled, said axle having wheels 13 located at its ends. The rear axle 10 extends some distance beyond the sides of the frame-section A, and near the extremities of the axle arms 14 are secured, said arms being located on opposite sides and curved in opposite directions, and upon the extremities of the arms marking-blocks 15 or their equivalents are attached.

Between the frame-section A and the marking-arms 14 the rear wheels 16 of the implement are loosely mounted upon the axle 10. The inner faces of the rear wheels 16 of the implement are provided with clutch-surfaces 17, engaged by clutch-sleeves 18, capable of sliding upon the axle 10.

Adjacent to each of the clutch-sleeves a bracket 19 is secured upon the frame-section A, and upon the outer ends of said brackets clutch-levers 20 are pivoted, engaging with the clutch-sleeves 18. A shifting-lever 21 is pivoted upon the rear of the frame-section A, the said lever having pivotally attached thereto links 22 and 23, one being attached at each side of its pivotal point. The link 23 is pivotally connected with one of the clutch-levers 20 and the link 22 with the opposite clutch-lever, as is best shown in Fig. 3. By manipulating the shifting-lever 21 the clutch-sleeves may be thrown either into or out of engagement with the clutch-surfaces of the rear supporting-wheels 16, which wheels also constitute driving-wheels.

A seat 25, adapted for the driver's use, is located at the rear of the frame-section A, and the shifting-lever 21 is in front of the seat within convenient reach of the driver.

Between the side members of the frame-section A a leg 26 is attached to the frame-section B, said leg being capable of vertical movement and provided with a rack-surface upon one side. In the lower end of the leg 26 a caster-wheel 27 is swiveled, and the leg is raised and lowered through the medium of a pinion 28, engaging with its rack-surface, said pinion being attached to the forward end of a shaft 29, suitably journaled in the frame, which shaft leads backward within convenient reach of the driver's seat, and is provided at its rear end with a hand-wheel 30 or the equivalent thereof.

In the end portions of the frame-section B, which extend beyond the section A, semicircular seed-pockets 31 are formed, and each of said seed-pockets is provided with an opening 32 in its bottom surface. A transverse shaft 33 is journaled in the frame-section A and the seed-pockets 31, the said shaft being provided at its extremities with attached semicircular seed-drop slides 34, which slides are each provided with two or more, preferably three, apertures or openings 35, and over each pocket-opening 32 a shield 36 is located, between which shields and the bottom of the seed-pockets the drop-slides have movement. The transverse shaft 33 is provided with an arm 33ᵃ, and on the axle 10 is an eccentric 37, the said eccentric being united by a connecting-rod 38 to the arm 33ᵃ of the transverse shaft 33, which arm is located, preferably, at the central portion of said shaft. Thus as the axle 10 is revolved a rotary reciprocating movement is imparted to the seed-drop slides.

In order that the implement may be made to register at any time with a given check-mark, it is necessary that the seed-drop slides be operated by hand, and the markers 15 likewise. This is effected by securing upon the axle a ratchet-wheel 39, adapted to be engaged by the horizontal member of an adjusting-lever 40, which lever is preferably fulcrumed upon the hub of the ratchet-wheel.

In operation, as the implement is drawn forward the rotation of the axle, when the rear wheels 16 are thrown in connection therewith, imparts to the seed-drop slides a rotary reciprocating movement and causes the openings 35 to register with the openings 32 in the bottom of the seed-pockets, and the shields 36 prevent any seed in the pocket from passing through the registering apertures except the seed contained between the walls of one of the apertures in the seed-drop slide. To turn the implement and cause it to register with a certain check-mark, the shaft 29 is manipulated until the caster-wheel 27 is brought in engagement with the ground sufficiently to elevate the forward wheels 13, whereupon the forward end of the implement is supported by the caster-wheel only. When the forward wheels are in this position, the forward end of the implement may be readily turned in any desired direction. The lever 21 is manipulated to throw the clutch-sleeves 18 out of engagement with the rear supporting-wheels, and when this is accomplished the adjusting-lever 40 is thrown in connection with the ratchet-wheel 39. As the adjusting-lever is mounted upon a bearing upon the axle in such manner that it may be carried in the direction of either the front or the rear of the implement, the axle may be revolved until two registering openings in the seed-drop slide and seed-pocket are brought over the check-row, whereupon the markers 15 will at the same time be brought into proper position.

When the machine is used as a check-rower, the side openings 35 in the drop-slides 34 are plugged up or otherwise closed, and the central ones only are employed to deliver the seed, as the markers 15 register only when the center openings of the drop-slides are over the openings 32 in the seed-pockets. When the machine is used for drilling, two or all of the openings 35 may be left uncovered in each drop-slide.

Having thus described my invention, I claim as new and desire to secure by Letters Patent—

1. In a planter, the combination, with a frame, the rear axle provided with markers, and wheels mounted on the axle, of semicircular seed-boxes, a transverse shaft provided with an arm at about its middle, semicircular seed-dropping slides on the shaft in the seed-boxes, an eccentric on the axle, a rod connecting the eccentric with the arm of the said shaft, a ratchet-wheel on the axle, and a lever engaging the ratchet-wheel, substantially as and for the purpose set forth.

2. In a planter, the combination, with a frame, a rear axle mounted in the frame, forwardly-extending arms on the frame, a front axle mounted in bearings on said arms, and wheels on the axles, of a rack sliding on the front of the frame between the said arms, a caster-wheel on the lower end of the rack, and a longitudinal shaft having a handle at its rear end and a pinion on its forward end, said pinion meshing with the rack, whereby provision is made for supporting the forward part of the frame on the caster-wheel to permit the machine to be readily turned, substantially as described.

3. A planter comprising a frame formed of sections A B, the section A being mounted on front and rear wheels and the section B mounted on section A and provided with semicircular seed-pockets, a transverse shaft provided with semicircular seed-dropping slides in the said pockets, means for operating the transverse shaft from the rear axle, markers on the rear axle, a clutch mechanism between the rear wheels and their axle, a caster-wheel between the front and rear axles, and means for raising and lowering the caster-wheel, substantially as herein shown and described.

EDWARD B. WELLS.

Witnesses:
L. M. SANFORD,
JOSEPH THOMASSON.